United States Patent [19]

Ohtsuka et al.

[11] Patent Number: 4,521,351

[45] Date of Patent: Jun. 4, 1985

[54] PROCESS FOR PRODUCING LIGHT-TRANSMITTING ELEMENT OF SYNTHETIC RESIN

[75] Inventors: Yasuji Ohtsuka; Yasuhiro Koike, both of Tokyo; Motoaki Yoshida, Nishinomiya, all of Japan

[73] Assignee: Nippon Sheet Glass Co., Ltd., Osaka, Japan

[21] Appl. No.: 533,532

[22] Filed: Sep. 16, 1983

[30] Foreign Application Priority Data

Jan. 27, 1983 [JP] Japan .................................. 58-11954
Jan. 27, 1983 [JP] Japan .................................. 58-11956

[51] Int. Cl.$^3$ .............................................. G02B 5/14
[52] U.S. Cl. ...................................... 264/1.5; 264/1.1; 264/1.4; 264/1.7; 264/2.1; 350/96.31; 350/96.34
[58] Field of Search ................ 264/1.5, 1.1, 1.4, 1.7, 264/2.1; 350/96.31, 96.34

[56] References Cited

U.S. PATENT DOCUMENTS 3,955,015  5/1976  Ohtsuka et al. .................. 350/96.31

OTHER PUBLICATIONS

"Light-Focusing Plastic Rod Prepared by Photocopolymerization of Methacrylic Ester With Vinyl Benzoates", Ohtsuka et al., *Applied Physics Letters*, vol. 29, No. 9, Nov. 1976, pp. 559–561.
"Studies on the Light-Focusing Plastic Rod, 10: A Light-Focusing Plastic Fiber of Methyl Methacrylate-Vinyl Benzoate Copolymer", Ohtsuka et al.,

*Applied Optics*, vol. 20, No. 15, Aug. 1981, pp. 2726–2730.
"Preparation of Light-Focusing Plastic Fiber by Heat-Drawing Process", Ohtsuka et al., *Applied Physics Letters*, vol. 29, No. 11, Dec. 1976, pp. 735–737.

*Primary Examiner*—James Lowe
*Attorney, Agent, or Firm*—Wenderoth, Lind & Ponack

[57] ABSTRACT

A process for producing a light-transmitting element of a synthetic resin, which comprises
(1) preparing a mixture composed of at least three monomers, said monomers having a difference in the ease of polymerization under given polymerization conditions, and that monomer in the monomeric mixture which is easiest to polymerize being capable of giving a polymer having a lower refractive index than a polymer from any of the other monomers in the monomeric mixture,
(2) maintaining the monomeric mixture in a predetermined shape, and
(3) thereafter applying to the monomeric mixture maintained in the predetermined shape such polymerization conditions that polymerization begins at the outside portion of the predetermined shape of the monomeric mixture and proceeds gradually toward its inside portion, thereby to form a polymeric article in which the proportion of polymer units derived from the monomer which is easiest to polymerize is largest at said outside portion and gradually decreases toward its inside portion and the refractive index of the article is lowest at said outside portion and gradually increases toward its inside portion.

2 Claims, 4 Drawing Figures

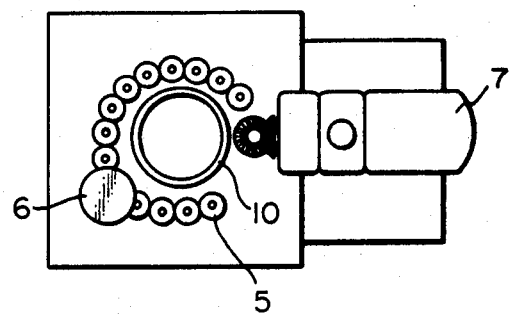
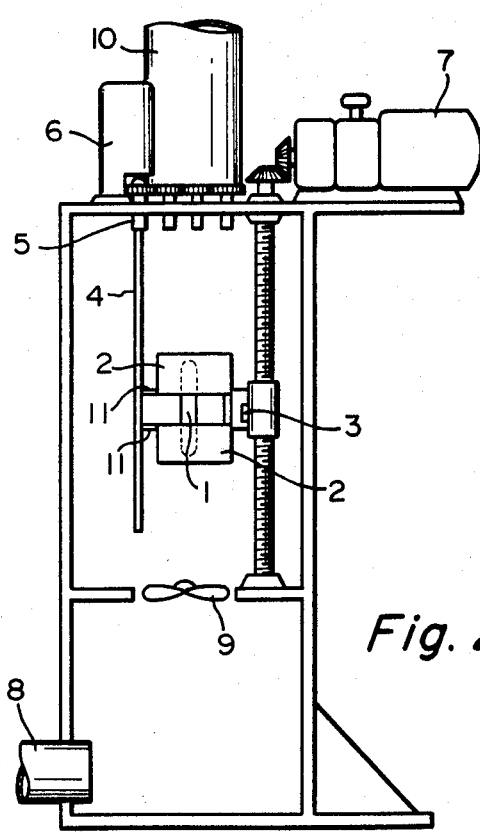
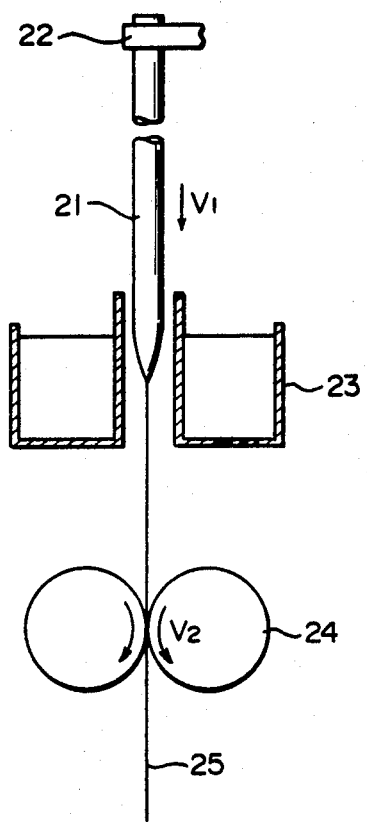

PROCESS FOR PRODUCING LIGHT-TRANSMITTING ELEMENT OF SYNTHETIC RESIN

BACKGROUND OF THE INVENTION (a) Field of the Invention

This invention relates to a process for producing a light-transmitting element composed of a synthetic resin. More specifically, this invention relates to a process for producing a light-transmitting element of a synthetic resin, of which refractive index gradually decreases from its central portion toward its marginal portion.

(b) Description of the Prior Art

Processes for the production of light-transmitting elements of synthetic resins are disclosed in U.S. Pat. No. 3,955,015 Japanese Patent Publication No. 30,301/1979 and Japanese Laid-Open Patent Publication No. 149,004/1981.

U.S. Pat. No. 3,955,015 discloses a method of manufacturing a transparent light-transmitting element of synthetic resin, which comprises producing a prepolymer from a monomer A, imparting a desired form to the prepolymer, contacting the prepolymer article with a monomer B to diffuse the monomer B in the prepolymer article to form a concentration gradient of the monomer B in the article decreasing from the surface to the interior of the article, and then subjecting the prepolymer and the monomer B to post-polymerization to complete the polymerization.

Japanese Patent Publication No. 30,301/1979 and Japanese Laid-Open Patent Publication No. 149,004/1981 disclose methods of producing light-transmitting elements of synthetic resin which have a refractive index distribution represented by the following equation (1)

$$N = N_o(1 - \tfrac{1}{2}A\, r^2) \quad (1)$$

wherein $N_o$ is the refractive index of the central axis of the light-transmitting element, $N$ is the refractive index of a point away from the central axis of the light-transmitting element by a distance $r$, and $A$ is its refractive index distribution constant.

However, polymeric articles obtained by the methods disclosed in these Japanese patent documents have the refractive index distribution of equation (1) only at their central portions, and to use them as light-transmitting elements, their marginal portions must be removed. The reasons are as follows:

These methods are based on the utilization of the fact that the composition of a copolymer varies with the progress of polymerization. Thus, according to these methods, monomers $M_1$ and $M_2$ are selected which when converted into polymers, have different refractive indices from each other and form a transparent copolymer; and then copolymerization conditions are selected such that copolymerization is started at a predetermined part of a monomeric mixture maintained in a predetermined form and then the resulting copolymer is continuously precipitated in the reaction system, thereby producing a light-transmitting element having a refractive index gradient.

The Japanese patent documents describe a method for producing a light-transmitting element of synthetic resin having a refractive index gradient, which comprises maintaining a mixture of monomers $M_1$ and $M_2$ in a predetermined form such as a cylindrical form, the monomers $M_1$ and $M_2$ having refractive indices differing from each other by 0.005 or larger and also having a Q value, defined by the following equation, of at least 1.1 or not more than 1/1.1, $$Q = \{r_1(M_1/M_2)_m + 1\}/\{(M_1/M_2)_m + r_2\} \quad (2)$$

wherein $r_1$ and $r_2$ are the monomer reactivity ratios of the monomers $M_1$ and $M_2$ in copolymerization reaction and $(M_1/M_2)_m$ is the mixing ratio in moles of $M_1/M_2$; and thereafter subjecting the monomeric mixture in the predetermined form to copolymerization conditions which are non-uniform in regard to place, whereby a copolymer having an $M_1/M_2$ ratio different from the aforesaid mixing ratio is locally formed only in a predetermined part of the mixture, for example only a peripheral portion of the mixture in cylindrical form, and thereafter from that part toward another part such as a central part, the copolymerization proceeds gradually, thereby to provide within the interior of the copolymer such a concentration gradient that the ratio of the $M_1$ content to the $M_2$ content gradually changes from said predetermined part toward said other part.

As a combination of monomers $M_1$ and $M_2$, the patent documents cite a combination of methyl methacrylate and vinyl benzoate, and also combinations of alkyl methacrylates and vinyl phenylacetates. Light-transmitting elements obtained from such combinations of monomers have refractive index distributions of equation (1) only near their central axis, and at their peripheral portions, the gradient of refractive index is very gentle. This is because the refractive index of the resulting copolymer gradually increases with the progress of polymerization, and the increase is gentle in the initial stage, but in the latter half of the polymerization process, the increase is abrupt. In order, therefore, to obtain rod-like convex lenses from light-transmitting elements obtained by these methods, it is necessary to use only those portions which are near their center by cutting off their peripheral portions.

SUMMARY OF THE INVENTION

It is an object of this invention therefore to provide a process for producing a light-transmitting element of a synthetic resin from a mixture of at least three monomers.

Another object of this invention is to provide a process for producing a light-transmitting element or a synthetic resin in which the distribution of refractive index can be easily controlled such that the distribution of refractive index from the marginal portion to the central portion of the light-transmitting element satisfies the above-given equation (1).

Still another object of this invention is to provide a process for producing a light-transmitting element of a synthetic resin which has a refractive index distribution satisfying equation (1) from its marginal portion to its central portion.

Other objects and advantages of this invention will become apparent from the following description.

According to this invention, these objects and advantages are achieved by a process for producing a light-transmitting element of a synthetic resin, which comprises (1) preparing a mixture composed of at least three monomers, said monomers having a difference in the ease of polymerization under given polymerization conditions, and that monomer in the monomeric mixture which is easiest to polymerize being capable of giving a polymer having a lower refractive index than a polymer from any of the other monomers in the monomeric mixture, (2) maintaining the monomeric mixture in a predetermined shape, and (3) thereafter applying to the monomeric mixture maintained in the predetermined shape such polymerization conditions that polymerization begins at the outside portion of the predetermined shape of the monomeric mixture and proceeds gradually toward its inside portion, thereby to form a polymeric article in which the proportion of polymer units derived from the monomer which is easiest to polymerize is largest at said outside portion and gradually decreases toward its inside portion and the refractive index of the article is lowest at said outside portion and gradually increase toward its inside portion.

BRIEF DESCRIPTION OF THE DRAWINGS

FIG. 1 is a top plan view of a polymerization reaction according to the present invention.

FIG. 2 is a partial sectional side elevational view of the apparatus shown in FIG. 1.

FIG. 3 is a view of a hot drawing apparatus showing the principle on which the rods are to be hot-drawn.

DESCRIPTION OF THE PREFERRED EMBODIMENTS

Figure 4:
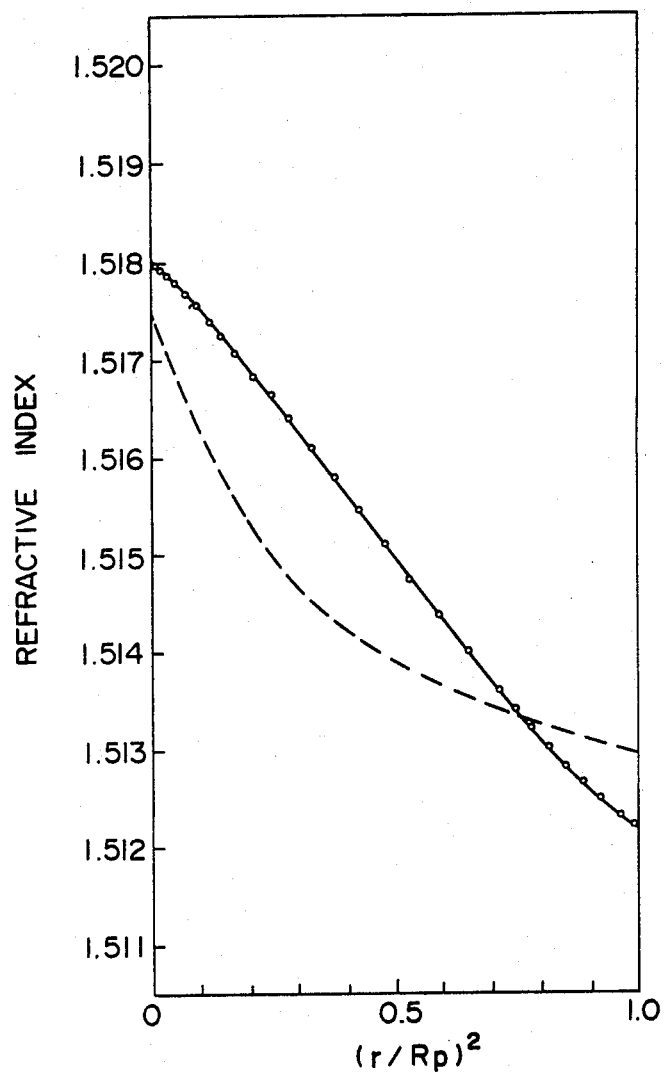

In the process of this invention, a monomeric mixture consisting of at least three monomers is used as a starting material.

Generally, a growing reaction in the copolymerization of multiple components is represented by the following reaction formula.

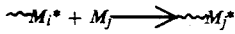

wherein $M_i^*$ represents a polymer chain whose end is an active species for $M_i$, $M_j$ represents a monomer, and $M_j^*$ represents a polymer chain whose end is an active species for $M_j$.

It is also known that the rate of reaction of this reaction is generally represented by $k_{ij}$, and the monomer reactivity ratio $r_{ij}$ is given by the following equation, $$r_{ij} = k_{ii}/k_{ij}$$

wherein $k_{ij}$ is as defined above, and $k_{ii}$ is a rate constant of a growing reaction of forming a polymer chain whose end is an active species for $M_i$ by the reaction of $m_i$ with the polymer chain whose end is an active species for $M_i$.

In the copolymerization of x components using x monomers, $x(x-1)$ reactivity ratios exist. For example, in a monomeric mixture composed of three monomers $M_1$, $M_2$ and $M_3$, the following six monomer reactivity ratios exist: $r_{12}=k_{11}/k_{12}$, $r_{21}=k_{22}/k_{21}$, $r_{13}=k_{11}/k_{13}$, $r_{31}=k_{33}/k_{31}$, $r_{23}=k_{22}/k_{23}$ and $r_{32}=k_{33}/k_{32}$.

The monomeric mixture used in the present invention contains at least three monomers, and these at least three monomers differ from each other in the ease of polymerization under given polymerization conditions. That monomer in the monomeric mixture which is easiest to polymerize gives a polymer which has a lower refractive index than a polymer obtained from any of the other monomers in the mixture.

The ease of polymerization of the three monomers depends upon the ease of reaction in the mutual relation of the monomers, and the concentrations of the monomers. The ease of reaction in the mutual relation of the monomers can be represented by the monomer reactivity ratio.

Preferably, the monomeric mixture in accordance with this invention contains three monomers differing from each other in the case of polymerization and satisfying the relation given by the following general formula (1)

$$\{r_{ij}(M_i/M_j)_m + 1\}/\{(M_i/M_j)_m + r_{ji}\} > 1.1 \tag{1}$$

wherein $i=1$ or 2, $j=2$ or 3, $i \neq j$. $(M_i/M_j)_m$ represents the mole ratio of monomer $M_i$ to monomer $M_j$, and $r_{ij}$ and $r_{ji}$ represent the monomer reactivity ratios.

The above general formula include the following three formulae according to the definitions of i and j.

$$\{r_{12}(M_1/M_2)_m + 1\}/\{(M_1/M_2)_m + r_{21}\} > 1.1 \tag{2}$$

$$\{r_{13}(M_1/M_3)_m + 1\}/\{(M_1/M_3)_m + r_{31}\} > 1.1 \tag{3}$$

$$\{r_{23}(M_2/M_3)_m + 1\}/\{(M_2/M_3)_m + r_{32}\} > 1.1 \tag{4}$$

Let the monomer in the monomeric mixture which is easiest to polymerize be $M_1$, then the following relation should be established among the three monomers $M_1$, $M_2$ and $M_3$.

$$n_1 < n_2 \text{ or } n_3 \tag{5}$$

wherein $n_1$ is the refractive index of a homopolymer of monomer $M_1$, $n_2$ is the refractive index of a homopolymer of monomer $M_2$ and $n_3$ is the refractive index of a homopolymer of monomer $M_3$.

If $M_2$ is easier to polymerize than $M_3$, either the relation $n_2 < n_3$ or the relation $n_2 > n_3$ may be established between $M_2$ and $M_3$.

Let us assume that $M_2$ is easier to polymerize than $M_3$. Then, in the process of this invention, three monomers $M_1$, $M_2$ and $M_3$ in which both a value of $(n_3-n_2)$ and a value of $(n_2-n_1)$ are at least 0.005 in the case of $n_1 < n_2 < n_3$ and three monomers $M_1$, $M_2$ and $M_2$ in which a value of $(n_2-n_1)$ is at least 0.005 and a value of $(n_3-n_1)$ is at least 0.001 in the case of $n_1 < n_3 < n_2$ are preferably used.

The above general formula with regard to monomer reactivity ratios shows conditions in which with the progress of the polymerization reaction, monomer $M_1$ first polymerizes rapidly and then monomer $M_2$ polymerizes and monomer $M_3$ polymerizes latest. In other words, a copolymer formed in the initial stage of polymerization contains a large amount of monomer $M_1$, but with the progress of polymerization, the content of $M_1$ rapidly decreases, and the content of the monomer $M_2$ increases. When the polymerization further proceeds, the content of $M_2$ also decreases, and the content of monomer $M_3$ increases.

The formula $n_1 < n_2$ or $n_3$ in regard to refractive index shows that with the progress of polymerization, the refractive index of the resulting copolymer increases. An abrupt rise in refractive index can be avoided because the refractive index of the copolymer can be gently increased with an increase in polymerization conversion over a broad range of conversion by adjustacrylonitrile, vinyl chloride, acrylamide, N-vinylcarbazole, N-vinylphthalimide, N-vinylpyrrolidone, vinylnaphthalene, vinylthiophene, vinylfurane and vinylphenyl sulfide.

The unsaturated compounds represented by formulae (a) to (f) are known compounds, and those skilled in the art will easily understand specific compounds defined by these formula without giving any exemplification.

Some especially preferred combinations of monomers $M_1$, $M_2$ and $M_3$ used in the present invention are exemplified below.

(1) $M_2$: 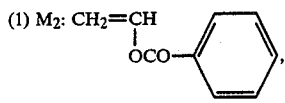

$M_3$: 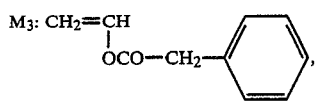

$M_1$: a monomer selected from the group consisting of unsaturated compounds of the following formula (k)

$$CH_2=\underset{\underset{COOR^6}{|}}{\overset{CH_3}{C}} \qquad (k)$$

wherein $R^6$ represents a linear or branched alkyl group having 1 to 10 carbon atoms, a cyclohexyl group, a β-phenethyl group, or furfuryl group,
unsaturated compounds of the following formula (l)

$$CH_2=\underset{\underset{COOR^7}{|}}{\overset{R^8}{C}} \qquad (l)$$

wherein $R^7$ represents a linear or branched alkyl group having 1 to 6 carbon atoms or a β-chloroethyl group, and $R^8$ represents a hydrogen atom or a chlorine atom, p-isopropylphenyl ethylene, 2,4-difluorophenyl ethylene, acrylonitriler and methacrylonitrile.

(2) $M_2$: 

$M_3$: 

$M_1$: a monomer selected from the group consisting of unsaturated compounds represented by the following formula (m)

$$CH_2=\underset{\underset{COOR^9}{|}}{\overset{CH_3}{C}} \qquad (m)$$

wherein $R^9$ represents a linear or branched alkyl group having 1 to 10 carbon atoms, or a cyclohexyl group, unsaturated compounds of the following formula (n)

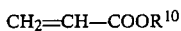 (n)

wherein $R^{10}$ represents a linear or branched alkyl group having 1 to 6 carbon atoms,
and 2,4-difluorophenyl ethylene.

(3)

$M_3$: the unsaturated compound of formula (f), $M_2$: a monomer selected from the group consisting of unsaturated compounds of formula (e) in which $R^1$ is methyl, ethyl or propyl, the unsaturated compounds of formula (d), compounds of formula (g) in which $R^4$ is a chlorinated or brominated aliphatic group, the unsaturated compounds of formula (f), acrylonitrile, vinyl chloride and acrylamide;

$M_1$: a monomer selected from the group consisting of unsaturated compounds of formula (a) in which $R^2$ is a hydrogen or chlorine atom and $R^1$ is a methyl, ethyl or propyl group, and unsaturated compounds of formula (a) in which $R^2$ is a methyl group and $R^1$ is a linear or branched alkyl group having 1 to 8 carbon atoms, a fluorinated alkyl group, or a cyclohexyl group.

According to the process of this invention, a monomeric mixture at least containing the three monomers $M_1$, $M_2$ and $M_3$ is first prepared. The mixing ratio of the three monomers differs depending upon the types of the monomers, the thickness of the resulting light-transmitting element, its refractive index distribution, the polymerization conditions, etc. When the total amount of these monomers is set at 100 parts, usually, 20 to 90 parts by weight of $M_1$, 2 to 40 parts by weight of $M_2$ and 5 to 60 parts by weight of $M_3$ are usually employed.

Usually, the monomeric mixture further contains a known photopolymerization initiator such as benzoyl peroxide and benzoin methyl ether.

According to this invention, the monomeric mixture is then maintained in a predetermined shape in order to subject it to polymerization reaction. To the monomeric mixture in this shape are applied such polymerization conditions that polymerization begins at the outside portion of the monomeric mixture in this shape and gradually proceeds toward its inside portion.

Referring to FIGS. 1 and 2, a prepared monomeric mixture is filled in each glass tube 4 having a closed end and an inside diameter of about 3 to about 10 mm. A tubular ultraviolet lamp 1 is located centrally in the apparatus, and a cylindrical light-shielding plate 2 is secured to each of the upper and lower sections of the lamp 1 so that the mixture in the glass tube 4 is irradiated only by ultraviolet light released from the central portion of the tubular lamp. A collar-like auxiliary light-shielding plate 11 is provided so that the light form the lamp 1 is released only into the space between the slight-shielding plates 2 (for example, 70 mm). The intensity of ultraviolet light is monitored by a silicon photocell 3. Preferably, the intensity of the ultraviolet light is maintained constant during polymerization. A plurality of glass tubes 4 filled with the monomeric mixture are mounted on a support member 5 at a predetermined distance, for example 10 cm, from the ultraviolet lamp 1, and rotated at a speed of, for example, 40 rpm by a motor 6. Initially, the ultraviolet lamp, for example, a 400 W lamp, is placed at a position lower than the lower ends of the glass tubes 4, and ultraviolet light is irradiated onto the glass tubes 4 while the lamp 1 is moved upwardly by a motor 7 at a predetermined rate of, for example, 0.3 to 3.0 mm/min. Air at a fixed temperature is sent into the inside of the apparatus by a fan 9 from an inlet 8, and discharged from a discharge opening 10. The temperature of the inside of the apparaing the types of the monomers and the ratio of the monomers charged.

It is believed to be easily understandable that in the case of $n_1 < n_2 < n_3$, the refractive index of the resulting copolymer increases with the progress of polymerization. For $n_1 < n_3 < n_2$, the following explanation may be given. A polymeric article obtained from a mixture of two monomers $M_1$ and $M_3$ (it is assumed that $M_1$ is easier to polymerize than $M_3$, and $n_1 < n_3$) has a gengle refractive index distribution at its marginal portion and an abruptly increasing refractive index near its central portion, as described, for example, in Japanese Patent Publication No. 30,301/1979. Monomers $M_1$, $M_2$ and $M_3$ satisfying the relation $n_1 < n_3 < n_2$ may be considered to be a system obtained by adding monomer $M_2$ having the ease of polymerization intermediate between $M_1$ and $M_3$ and giving a homopolymer having a higher than the refractive indices of homopolymers of $M_1$ and $M_3$ to the above two-component copolymerization system. It can therefore been explained that in the case of $n_1 < n_3 < n_2$, the combination of a gentle refractive index distribution and an abrupt refractive index distribution, which is obtained in the case of the two-component copolymerization system, is changed to a smooth refractive index distribution nearly in accordance with a parabolic distribution from the central portion to the marginal portion by the effect of monomer $M_2$ to increase refractive index.

Examples of the monomer $M_1$ which is defined as a monomer that is easiest to polymerize and gives a homopolymer having the lowest refractive index include unsaturated compounds represented by the following formula (a)

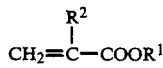
(a)

wherein $R^1$ represents a linear or branched alkyl group having 1 to 10 carbon atoms or a fluorinated alkyl group having 1 to 10 carbon atoms, or a cyclohexyl group, and $R^2$ represents a hydrogen atom, a chlorine atom or a methyl gorup,
unsaturated compounds represented by the following formula (b)

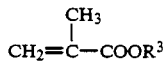
(b)

wherein $R^3$ represents a group of the formula

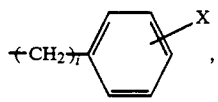

a group of the formula

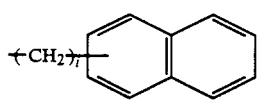

or a furfuryl group (in which i is 0, 1, 2 or 3, and X is a hydrogen, chlorine or bromine atom), unsaturated compounds represented by the following formula (c)

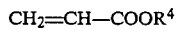
(c)

wherein $R^4$ represents a chlorinated or brominated aliphatic group, preferably a chlorinated or brominated alkyl group, having 1 to 10 carbon atoms,
p-isopropylphenyl ethylene, 2,4-difluorophenyl ethylene, acrylonitrile and methacrylonitrile.

Examples of the monomers $M_2$ and $M_3$ include unsaturated compounds represented by the following formula (d)

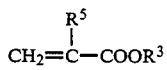
(d)

wherein $R^3$ is the same as defined for formula (b), and $R^5$ represents a hydrogen atom or a methyl group,
unsaturated compounds represented by the following formula (e)

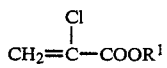
(e)

wherein $R^1$ is as defined for formula (a),
unsaturated compounds represented by the following formula (f)

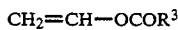
(f)

wherein $R^3$ is as defined for formula (b),
unsaturated compounds represented by the following formula (g)

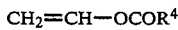
(g)

wherein $R^4$ is as defined for formula (c),
unsaturated compounds represented by the following formula (h)

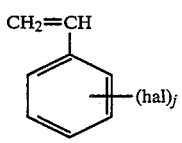
(h)

wherein hal represents a halogen atom and j is 1, 2 or 3,
unsaturated compounds represented by the following formula (i)

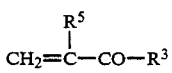
(i)

wherein $R^3$ and $R^5$ are as defined for formula (d),
unsaturated compounds represented by the following formula (j)

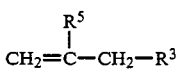
(j)

wherein $R^3$ and $R^5$ are as defined for formula (d), tus rises owing to the generation of heat from the lamp 1, but becomes constant at a temperature some point higher than the temperature of the air sent. Photo-copolymerization starts at the outside portions of the bottoms of the glass tubes 4 which are first exposed to ultraviolet radiation. Volume shrinkage occurs owing to polymerization. But since the monomeric mixture is always fed from that part in the upper section of each of the glass tubes which has not yet undergone ultraviolet irradiation, no space is formed inside the polymer. With the movement of the lamp 1, polymerization proceeds gradually upwardly until at last all of the monomeric mixture in each glass tube 4 is solidified. After the lapse of a predetermined period of time, for example about 10 hours, from the starting of irradiation, the ultraviolet irradiation is stopped, and the glass tubes 4 are removed from the apparatus. Then, preferably, the glass tubes are heated at a temperature of, for example, 80° C. to polymerize the remaining monomers as completely as possible. Then, the glass tubes are crushed, and the copolymer rods are taken out. Each of the rods show a fixed refractive index distribution constant A except its both end portions. Light-converging fibers can be obtained by heating and stretching each of the resulting rods (light-transmitting elements). It is recommended that prior to heating and stretching of the rods, the rods are left to stand under a reduced pressure of $10^{-3}$ to $10$-$10^{-4}$ mmHg at 50° C. for 3 to 4 days in order to remove traces of volatile substances contained in the rods.

FIG. 3 shows a hot-drawing apparatus showing the principle on which the rods are to be hot-drawn. Each of the polymeric rods as a pre-form 21 is mounted on a support member 22, and then allowed to descend at a velocity $V_1$ (mm/sec), passed between heaters 23 at a fixed temperature Td, and pulled and stretched at a velocity of $V_2$ mm/sec by a drive roll 24 below. $V_2/V_1$ is a draw ratio. The resulting polymeric fiber 25 is cut and polished to form a rod lens having a length of 1 to 2 mm. From the lens action of the resulting lens, the refractive index distribution constant A for equation (1) is determined. On the other hand, the resulting optical fiber is wound on a drum, and laser light (6328 Å) is caused to fall upon one end of the fiber and the intensity of the light going out from the other end is measured. The transmission loss is determined from the relation between the length of the fiber and the intensity of the emitting light.

The following examples illustrate the present invention more specifically. All parts in these examples are by weight.

EXAMPLES 1 TO 4

In each run, a monomeric mixture was prepared from methyl methacrylate (MMA; monomer $M_1$) whose homopolymer had a refractive index of 1.492, acrylonitrile (AN; monomer $M_2$) whose homopolymer had a refractive index of 1.52, vinyl benzoate (VB; monomer $M_3$) whose homopolymer had a refractive index of 1.578 and benzoyl peroxide (BPO) as a photopolymerization initiator in the proportions shown in Table 1.

Rods were produced by using the polymerization apparatus shown in FIGS. 1 and 2 and the polymerization conditions shown in Table 4. The properties of the resulting rods are also shown in Table 1. The monomer reactivity ratios were as follows: $r_{12}=1.34$, $r_{13}=8.32$, $r_{21}=0.12$, $r_{23}=3.0$, $r_{31}=0.07$, and $r_{32}=0.05$. In Example 1, the values on the left sides of formulae (2), (3) and (4) were 1.56, 8.62, and 5.68. They all satisfied formulae (2), (3) and (4).

As an ultraviolet lamp, a photochemical mercury lamp (Toshiba H400-P) made by Toshiba Co. was used.

TABLE 1

| | Example | | | |
|---|---|---|---|---|
| | 1 | 2 | 3 | 4 |
| Photo-copolymerization conditions | | | | |
| MMA (parts) | 66.2 | 67.0 | 65.0 | 66.7 |
| AN (parts) | 9.3 | 8.2 | 7.9 | 8.3 |
| VB (parts) | 24.5 | 24.8 | 26.3 | 25.0 |
| BPO (parts) | 0.8 | 0.5 | 1.0 | 0.5 |
| Lamp moving velocity V (mm/min.) | 0.7 | 0.6 | 1.0 | 0.8 |
| Characteristics of the rod | | | | |
| Refractive index distribution constant A ($10^{-3}$ mm$^{-2}$) | 5.68 | 4.63 | 3.15 | 3.67 |
| Radius $R_p$ (mm) of the rod | 1.45 | 1.45 | 1.45 | 1.45 |
| Radius $R_c$ (mm) of the parabolic distribution | 1.45 | 1.45 | 1.45 | 1.45 |
| Numerical aperature (NA) | 0.166 | 0.150 | 0.129 | 0.133 |

The refractive index distribution of the rod obtained in Example 4 is shown in FIG. 4.

For comparison, the refractive index distribution of a light-transmitting element having the same dimension as in Example 4 and produced by using 75 parts of MMA and 25 parts of VB without using AN for comparison is shown by a dotted line in FIG. 4. In FIG. 4, the ordinate represents refractive index and the abscissa, the square of the ratio of the distance (r) between the central axis of the rod and an arbitrary point to the distance ($R_p$) between the central axis and the peripheral surface.

The rod of Example 1 was hot-drawn to 100 times at 270° C. to obtain an optical fiber having a diameter of 0.29 mm, a refractive index distribution constant A of 0.563 mm$^{-2}$ and a transmission loss of 1.2 dB/m.

EXAMPLES 5 TO 10

In each run, a light-transmitting element was produced by using the three components shown in Table 2 under the conditions shown in Table 2. The results are shown in Table 2.

TABLE 2

| | | Example No. | | | | | |
|---|---|---|---|---|---|---|---|
| | | 5 | 6 | 7 | 8 | 9 | 10 |
| Photo-copolymerization conditions | Monomer $M_1$ (parts) | i-PMA (3.5) | MMA (2.5) | MMA (2.7) | MMA (6.6) | MMA (3.0) | MMA (2.5) |
| | Monomer $M_2$ (parts) | AN (0.2) | AN (0.2) | VCA (0.5) | VCA (1.6) | VB (0.6) | BA (1.5) |
| | Monomer $M_3$ (parts) | VB (1.0) | VPA (1.0) | VPA (1.0) | VB (1.8) | VPA (1.0) | VB (1.0) |
| | BPO (parts) | 0.047 | 0.019 | 0.034 | 0.080 | 0.046 | 0.050 |
| | Lamp moving speed (mm/min.) | 0.6 | 0.8 | 0.6 | 0.6 | 0.6 | 0.6 |

TABLE 2-continued

| Characteristics of the rod | | Example No. | | | | | |
|---|---|---|---|---|---|---|---|
| | | 5 | 6 | 7 | 8 | 9 | 10 |
| | Refractive index distribution constant A ($10^{-3}$ mm$^{-2}$) | 2.9 | 1.0 | 1.6 | 3.7 | 2.6 | 3.2 |
| | Radius $R_p$ (mm) of the rod | 1.39 | 1.30 | 1.30 | 1.15 | 1.60 | 1.41 |
| | Radius $R_c$ (mm) of the parabolic distribution | 1.31 | 1.20 | 1.25 | 1.10 | 1.47 | 1.35 |
| | Numerical aperture (NA) | 0.11 | 0.66 | 0.08 | 0.10 | 0.11 | 0.12 |

(*) i-PMA = isopropyl methacrylate, VCA = vinyl chloroacetate, BA = benzyl acrylate, VPA = vinyl phenylacetate.

EXAMPLE 11

Benzoyl peroxide (0.46 part) was dissolved in a mixture consisting of 30 parts of methyl methacrylate (monomer $M_1$) whose homopolymer had a refractive index of 1.492, 6 parts of vinyl benzoate (monomer $M_2$) whose homopolymer had a refractive index of 1.578 and 10 parts of vinyl phenylacetate (monomer $M_3$) whose homopolymer had a refractive index of 1.567, and the monomeric mixture was photo-copolymerized in the same way as in Example 1. The reactivity ratios of the individual monomers were as follows: $r_{12}=8.30$, $r_{21}=0.049$, $r_{13}=22.76$, $r_{31}=0.00494$, $r_{23}=4.54$ and $r_{32}=0.17$. The values of the left sides of the formulae (2), (3) and (4) were 8.38, 22.9, and 4.82, respectively. They all satisfied these formulae. The speed of moving the UV lamp was 0.6 mm/min.

There was obtained a transparent rod having a radius of 1.45 mm. It had a refractive distribution constant A of $2.6 \times 10^{-3}$ mm$^{-2}$, and the refractive index showed a parabolic distribution up to the marginal peripheral portion of the rod.

The rod was hot-drawn to 100 times at 220° C. to form a fiber having a diameter of 0.29 mm which had a transmission loss of 0.8 dB/m.

What we claim is:

1. A process for producing a light-transmitting element of a synthetic resin, which comprises (1) preparing a mixture composed of at least three monomers, said monomers having a difference in the ease of polymerization under given polymerization conditions, and that monomer in the monomeric mixture which is easiest to polymerize being capable of giving a polymer having a lower refractive index than a polymer from any of the other monomers in the monomeric mixture, (2) maintaining the monomeric mixture in a predetermined shape, and (3) thereafter applying to the monomeric mixture maintained in the predetermined shape such polymerization conditions that polymerization begins at the outside portion of the predetermined shape of the monomeric mixture and proceeds gradually toward its inside portion, thereby to form a polymeric article in which the proportion of polymer units derived from the monomer which is easiest to polymerize is largest at said outside portion and gradually decreases toward its inside portion and the refractive index of the article is lowest at said outside portion and gradually increases toward its inside portion;

wherein when three monomers of said monomeric mixture are designated as $M_1$, $M_2$ and $M_3$, the mole ratios of these monomers with each other are represented by $(M_1/M_2)_m$, $(M_1/M_3)_m$ and $(M_2/M_3)_m$, and the reactivity ratios of these monomers to each other are represented in accordance with an ordinary definition by $r_{12}$, $r_{13}$, $r_{21}$, $r_{23}$, $r_{31}$ and $r_{32}$, said monomeric mixture contains monomers satisfying the following three formulae $\{r_{12}(M_1/M_2)_m + 1\}/\{(M_1/M_2)_m + r_{21}\} > 1.1$, $\{r_{13}(M_1/M_3)_m + 1\}/\{(M_1/M_3)_m + r_{31}\} > 1.1$, $\{r_{23}(M_2/M_3)_m + 1\}/\{(M_2/M_3)_m + r_{32}\} > 1.1$, as said at least three monomers.

2. The process of claim 1 which wherein the light-transmitting element of a synthetic resin is in the shape of a rod or fiber, and has a refractive index distribution such that its refractive index decreases from its central axis toward its peripheral portion in the longitudinal direction substantially in proportion to the square of the distance.

* * * * *